US010286299B2

(12) United States Patent
Osman et al.

(10) Patent No.: US 10,286,299 B2
(45) Date of Patent: *May 14, 2019

(54) TRANSITIONING GAMEPLAY ON A HEAD-MOUNTED DISPLAY

(71) Applicant: Sony Interactive Entertainment Inc., Tokyo (JP)

(72) Inventors: Steven Osman, San Francisco, CA (US); Xiadong Mao, Foster City, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/859,630

(22) Filed: Dec. 31, 2017

(65) Prior Publication Data

US 2018/0147483 A1 May 31, 2018

Related U.S. Application Data

(63) Continuation of application No. 14/231,609, filed on Mar. 31, 2014, now Pat. No. 9,878,235.

(Continued)

(51) Int. Cl.
*G06F 3/01* (2006.01)
*A63B 69/36* (2006.01)
(Continued)

(52) U.S. Cl.
CPC .............. *A63F 13/00* (2013.01); *A63F 13/25* (2014.09); *A63F 13/493* (2014.09);
(Continued)

(58) Field of Classification Search
CPC . G02B 27/017; A63F 2300/8082; A63F 13/00
See application file for complete search history.

(56) References Cited

U.S. PATENT DOCUMENTS 8,000,581 B2 8/2011 Zalewski
8,576,276 B2 11/2013 Bar-Zeev et al.
(Continued)

FOREIGN PATENT DOCUMENTS

CN 101595504 A 12/2009
CN 101627622 A 1/2010
(Continued)

OTHER PUBLICATIONS

Steinicke, Frank et al., "Does a Gradual Transition to the Virtual World Increase Presence?," Virtual Reality Conf, 2009. IEEE, Lafayette, Louisiana, USA, Mar. 14, 2009, pp. 203-210 (XP031465473), ISBN: 978-1-4244-3943-0.

(Continued)

*Primary Examiner* — David Duffy
*Assistant Examiner* — Ankit Doshi
(74) *Attorney, Agent, or Firm* — Penilla IP, APC

(57) ABSTRACT

A method includes the following: presenting gameplay of a video game through a head-mounted display (HMD), the HMD being disposed in a local environment; detecting a person speaking in the local environment, wherein detecting the person speaking includes capturing audio from the local environment by the HMD, and analyzing the captured audio to identify the person speaking in the local environment; responsive to detecting the person speaking in the local environment, presenting a notification through the HMD, the notification providing an option to pause the gameplay of the video game; responsive to receiving a command indicating selection of the option, pausing the gameplay of the video game and presenting through the HMD a view through an externally facing camera of the HMD that enables viewing of the person speaking in the local environment.

20 Claims, 13 Drawing Sheets

Related U.S. Application Data

(60) Provisional application No. 61/832,762, filed on Jun. 7, 2013.

(51) Int. Cl.
| | | |
|---|---|---|
| *A63F 13/00* | (2014.01) | |
| *G02B 27/01* | (2006.01) | |
| *A63F 13/25* | (2014.01) | |
| *A63F 13/497* | (2014.01) | |
| *A63F 13/5258* | (2014.01) | |
| *A63F 13/493* | (2014.01) | |
| *H04M 19/04* | (2006.01) | |

(52) U.S. Cl.
CPC ........ *A63F 13/497* (2014.09); *A63F 13/5258* (2014.09); *G02B 27/017* (2013.01); *H04M 19/04* (2013.01); *G02B 2027/014* (2013.01); *G02B 2027/0118* (2013.01)

(56) References Cited

U.S. PATENT DOCUMENTS

| | | | |
|---|---|---|---|
| 8,847,851 B2 | 9/2014 | Yamamoto | |
| 9,310,884 B2* | 4/2016 | Benson | G02B 27/017 |
| 2008/0004095 A1 | 1/2008 | Hayasaka | |
| 2008/0114645 A1 | 5/2008 | Zalewski | |
| 2010/0271587 A1 | 10/2010 | Pavlopoulos | |
| 2013/0147686 A1* | 6/2013 | Clavin | G06F 3/013 345/8 |
| 2014/0364212 A1* | 12/2014 | Osman | A63F 13/213 463/31 |

FOREIGN PATENT DOCUMENTS

| | | |
|---|---|---|
| CN | 101796450 A | 8/2010 |
| CN | 102540464 A | 7/2012 |
| CN | 103091844 A | 5/2013 |
| JP | 10-085450 | 4/1998 |
| JP | 11-161814 | 6/1999 |
| JP | 2000-339490 | 12/2000 |
| JP | 2001-038049 | 2/2001 |
| JP | 2008-011940 | 1/2008 |
| JP | 2010-509873 | 3/2010 |
| WO | 2008058276 A2 | 5/2008 |
| WO | 2013052855 A2 | 4/2013 |

OTHER PUBLICATIONS

Invitation to Pay Additional Fees and, Where Applicable, Protest Fee (Form PCT/ISA/206), issued in Int'l Application No. PCT/US2014/041422, dated Oct. 14, 2014 (4 pages).
Notification of Transmittal of the International Search Report and the Written Opinion issued in International Application No. PCT/US2014/041422, dated Dec. 10, 2014 (18 total pages).
Extended European Search Report (EESR) issued in European Application No. 17169562.0-1906, dated Aug. 30, 2017 (9 pages).
Notification of Reason(s) for Refusal, issued in related Japanese Patent Application No. 2016-518054, dated Jan. 10, 2016 (9 total pages).
Communication pursuant to Article 94(3) EPC, issued in related European Patent Application No. 14 736 171.1-1906, dated Mar. 21, 2017 (5 pages).
Decision of Refusal, issued in related Japanese Patent Application No. 2016-518054, dated May 30, 2017 (8 total pages).
First Office Action issued in corresponding Chinese Patent Application No. 201480039341.8, dated Jun. 29, 2018, with Eng. translation (20 total pages).
Notification of Reason(s) for Refusal issued in corresponding Japanese Patent Application No. 2017-165796, dated Jul. 31, 2018, with Eng. translation (9 total pages).

* cited by examiner

TRANSITIONING GAMEPLAY ON A HEAD-MOUNTED DISPLAY

CLAIM OF PRIORITY

This application claims priority as a continuation of U.S. application Ser. No. 14/231,609, filed Mar. 31, 2014, entitled "TRANSITIONING GAMEPLAY ON A HEAD-MOUNTED DISPLAY," which claims priority to U.S. Provisional Application No. 61/832,762, filed Jun. 7, 2013, entitled "TRANSITIONING GAMEPLAY ON A HEAD-MOUNTED DISPLAY," the disclosure of which is incorporated by reference herein.

BACKGROUND

1. Field of the Invention

The present invention relates to methods and systems for transitioning gameplay on a head-mounted display.

2. Description of the Related Art

The video game industry has seen many changes over the years. As computing power has expanded, developers of video games have likewise created game software that takes advantage of these increases in computing power. To this end, video game developers have been coding games that incorporate sophisticated operations and mathematics to produce a very realistic game experience.

Example gaming platforms, may be the Sony Playstation®, Sony Playstation2® (PS2), and Sony Playstation3® (PS3), each of which is sold in the form of a game console. As is well known, the game console is designed to connect to a monitor (usually a television) and enable user interaction through handheld controllers. The game console is designed with specialized processing hardware, including a CPU, a graphics synthesizer for processing intensive graphics operations, a vector unit for performing geometry transformations, and other glue hardware, firmware, and software. The game console is further designed with an optical disc tray for receiving game compact discs for local play through the game console. Online gaming is also possible, where a user can interactively play against or with other users over the Internet. As game complexity continues to intrigue players, game and hardware manufacturers have continued to innovate to enable additional interactivity and computer programs.

A growing trend in the computer gaming industry is to develop games that increase the interaction between the user and the gaming system. One way of accomplishing a richer interactive experience is to use wireless game controllers whose movement is tracked by the gaming system in order to track the player's movements and use these movements as inputs for the game. Generally speaking, gesture input refers to having an electronic device such as a computing system, video game console, smart appliance, etc., react to some gesture made by the player and captured by the electronic device.

Another way of accomplishing a more immersive interactive experience is to use a head-mounted display. A head-mounted display is worn by the user and can be configured to present various graphics, such as a view of a virtual space. The graphics presented on a head-mounted display can cover a large portion or even all of a user's field of view. Hence, a head-mounted display can provide a visually immersive experience to the user.

Another growing trend in the industry involves the development of cloud-based gaming systems. Such systems may include a remote processing server that executes a game application, and communicates with a local thin client that can be configured to receive input from users and render video on a display.

It is in this context that embodiments of the invention arise.

SUMMARY

Embodiments of the present invention provide methods and systems for transitioning gameplay of a video game. It should be appreciated that the present invention can be implemented in numerous ways, such as a process, an apparatus, a system, a device or a method on a computer readable medium. Several inventive embodiments of the present invention are described below.

In one embodiment, a method for transitioning gameplay is provided, the method including: receiving a signal to interrupt gameplay of a video game, the gameplay being presented on a head-mounted display; in response to receiving the signal, transitioning the gameplay from an active state to a paused state; wherein transitioning the gameplay includes identifying an intensity of a gameplay aspect, and progressively reducing the intensity of the gameplay aspect before entering the paused state.

In one embodiment, the intensity of the gameplay aspect is defined by a velocity of a virtual element; and progressively reducing the intensity of the gameplay aspect includes progressively reducing the velocity of the virtual element.

In one embodiment, a location of the virtual element in a virtual space defines a view of the virtual space presented on the head-mounted display; the view of the virtual space changing in accordance with the velocity of the virtual element.

In one embodiment, the intensity of the gameplay aspect is defined by a density of virtual elements presented on the head-mounted display; and progressively reducing the intensity of the gameplay aspect includes progressively reducing the density of virtual elements presented on the head-mounted display.

In one embodiment, the intensity of the gameplay aspect is defined by a complexity of graphics presented on the head-mounted display; and progressively reducing the intensity of the gameplay aspect includes progressively simplifying the graphics presented on the head-mounted display.

In one embodiment, the method further includes the following: receiving a signal to resume gameplay of the video game; in response to receiving the signal to resume gameplay, transitioning the gameplay from the paused state to the active state; wherein transitioning the gameplay from the paused state to the active state includes progressively increasing the intensity of the gameplay aspect.

In one embodiment, transitioning the gameplay from the paused state to the active state includes identifying a gameplay timepoint earlier than a gameplay timepoint at which the gameplay was paused, and initiating the transitioning from the paused state to the active state from the earlier gameplay timepoint.

In another embodiment, a non-transitory computer readable medium having program instructions for transitioning gameplay embodied thereon is provided, the program instructions including: program instructions for receiving a signal to interrupt gameplay of a video game, the gameplay being presented on a head-mounted display; program instructions for, in response to receiving the signal, transitioning the gameplay from an active state to a paused state; wherein transitioning the gameplay includes identifying an intensity of a gameplay aspect, and progressively reducing the intensity of the gameplay aspect before entering the paused state.

In another embodiment a system comprising at least one computing device having logic for transitioning gameplay is provided, the logic including: logic for receiving a signal to interrupt gameplay of a video game, the gameplay being presented on a head-mounted display; logic for, in response to receiving the signal, transitioning the gameplay from an active state to a paused state; wherein transitioning the gameplay includes identifying an intensity of a gameplay aspect, and progressively reducing the intensity of the gameplay aspect before entering the paused state.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which.

DETAILED DESCRIPTION

The following embodiments describe methods and apparatus for transitioning gameplay on a head-mounted display.

It will be obvious, however, to one skilled in the art, that the present invention may be practiced without some or all of these specific details. In other instances, well known process operations have not been described in detail in order not to unnecessarily obscure the present invention.

Figure 1:
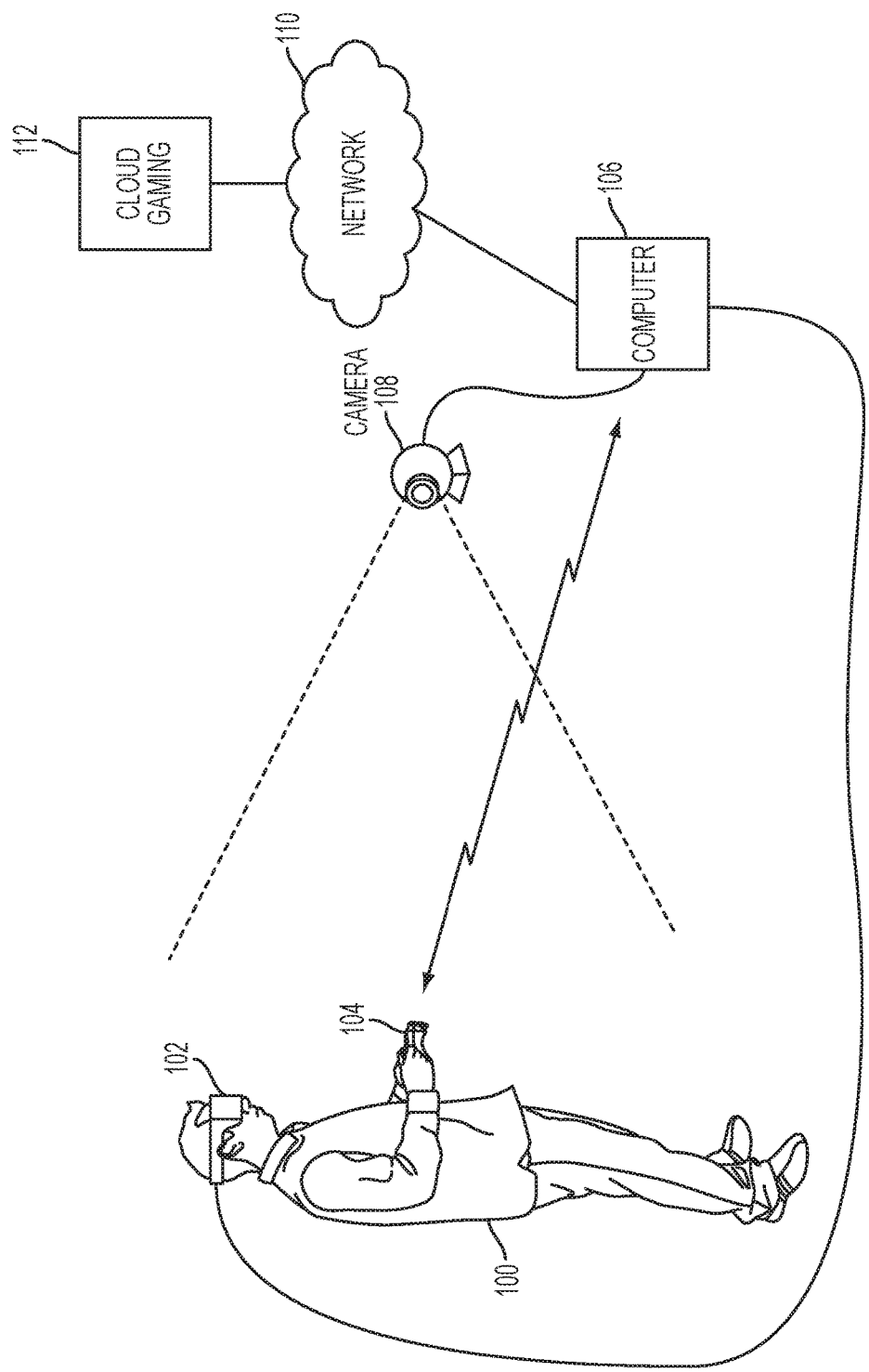
FIG. 1 illustrates a system for interactive gameplay of a video game, in accordance with an embodiment of the invention.

FIG. 1 illustrates a system for interactive gameplay of a video game, in accordance with an embodiment of the invention. A user 100 is shown wearing a head-mounted display (HMD) 102. The HMD 102 is worn in a manner similar to glasses, goggles, or a helmet, and is configured to display a video game or other content to the user 100. The HMD 102 provides a very immersive experience to the user by virtue of its provision of display mechanisms in close proximity to the user's eyes. Thus, the HMD 102 can provide display regions to each of the user's eyes which occupy large portions or even the entirety of the field of view of the user.

In one embodiment, the HMD 102 can be connected to a computer 106. The connection to computer 106 can be wired or wireless. The computer 106 can be any general or special purpose computer known in the art, including but not limited to, a gaming console, personal computer, laptop, tablet computer, mobile device, cellular phone, tablet, thin client, set-top box, media streaming device, etc. In one embodiment, the computer 106 can be configured to execute a video game, and output the video and audio from the video game for rendering by the HMD 102.

The user 100 may operate a controller 104 to provide input for the video game. Additionally, a camera 108 can be configured to capture image of the interactive environment in which the user 100 is located. These captured images can be analyzed to determine the location and movements of the user 100, the HMD 102, and the controller 104. In one embodiment, the controller 104 includes a light which can be tracked to determine its location and orientation. Additionally, as described in further detail below, the HMD 102 may include one or more lights which can be tracked to determine the location and orientation of the HMD 102. The camera 108 can include one or more microphones to capture sound from the interactive environment. Sound captured by a microphone array may be processed to identify the location of a sound source. Sound from an identified location can be selectively utilized or processed to the exclusion of other sounds not from the identified location. Furthermore, the camera 108 can be defined to include multiple image capture devices (e.g. stereoscopic pair of cameras), an IR camera, a depth camera, and combinations thereof.

In another embodiment, the computer 106 functions as a thin client in communication over a network with a cloud gaming provider 112. The cloud gaming provider 112 maintains and executes the video game being played by the user 102. The computer 106 transmits inputs from the HMD 102, the controller 104 and the camera 108, to the cloud gaming provider, which processes the inputs to affect the game state of the executing video game. The output from the executing video game, such as video data, audio data, and haptic feedback data, is transmitted to the computer 106. The computer 106 may further process the data before transmission or may directly transmit the data to the relevant devices. For example, video and audio streams are provided to the HMD 102, whereas a vibration feedback command is provided to the controller 104.

In one embodiment, the HMD 102, controller 104, and camera 108, may themselves be networked devices that connect to the network 110 to communicate with the cloud gaming provider 112. For example, the computer 106 may be a local network device, such as a router, that does not otherwise perform video game processing, but facilitates passage network traffic. The connections to the network by the HMD 102, controller 104, and camera 108 may be wired or wireless.

Figure 2:
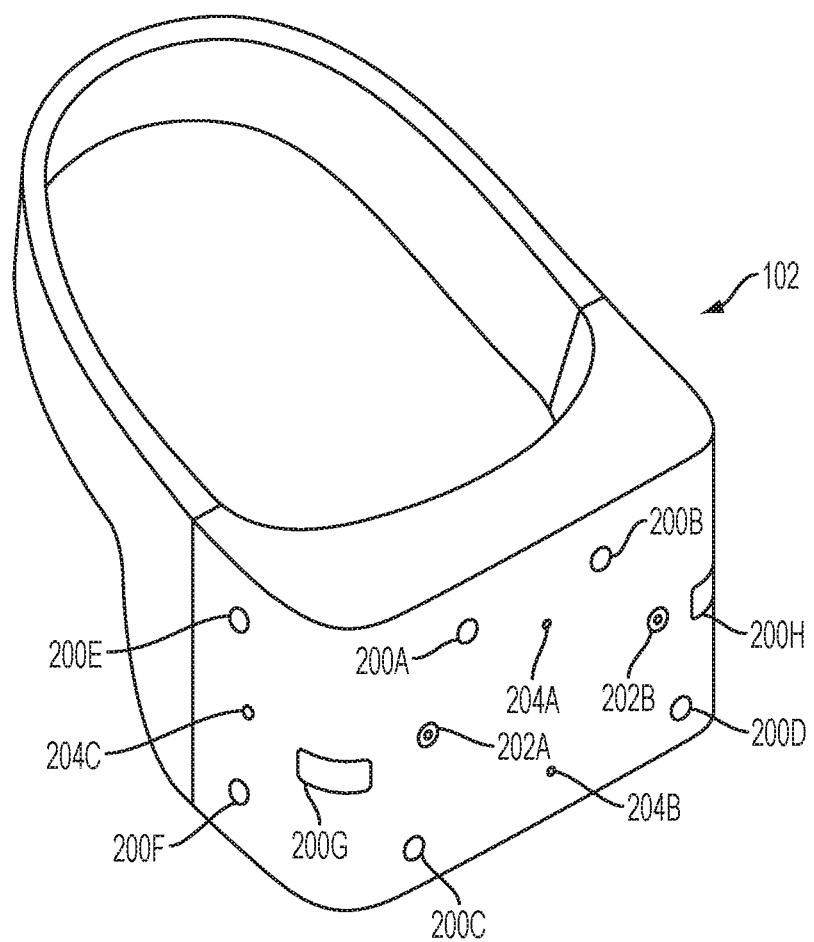
FIG. 2 illustrates a head-mounted display (HMD), in accordance with an embodiment of the invention.

FIG. 2 illustrates a head-mounted display (HMD), in accordance with an embodiment of the invention. As shown, the HMD 102 includes a plurality of lights 200A-H. Each of these lights may be configured to have specific shapes, and can be configured to have the same or different colors. The lights 200A, 200B, 200C, and 200D are arranged on the front surface of the HMD 102. The lights 200E and 200F are arranged on a side surface of the HMD 102. And the lights 200G and 200H are arranged at corners of the HMD 102, so as to span the front surface and a side surface of the HMD 102. It will be appreciated that the lights can be identified in captured images of an interactive environment in which a user uses the HMD 102. Based on identification and tracking of the lights, the location and orientation of the HMD 102 in the interactive environment can be determined. It will further be appreciated that some of the lights may or may not be visible depending upon the particular orientation of the HMD 102 relative to an image capture device. Also, different portions of lights (e.g. lights 200G and 200H) may be exposed for image capture depending upon the orientation of the HMD 102 relative to the image capture device.

In one embodiment, the lights can be configured to indicate a current status of the HMD to others in the vicinity. For example, some or all of the lights may be configured to have a certain color arrangement, intensity arrangement, be configured to blink, have a certain on/off configuration, or other arrangement indicating a current status of the HMD 102. By way of example, the lights can be configured to display different configurations during active gameplay of a video game (generally gameplay occurring during an active timeline or within a scene of the game) versus other non-active gameplay aspects of a video game, such as navigating menu interfaces or configuring game settings (during which the game timeline or scene may be inactive or paused). The lights might also be configured to indicate relative intensity levels of gameplay. For example, the intensity of lights, or a rate of blinking, may increase when the intensity of gameplay increases. In this manner, a person external to the user may view the lights on the HMD 102 and understand that the user is actively engaged in intense gameplay, and may not wish to be disturbed at that moment.

The HMD 102 may additionally include one or more microphones. In the illustrated embodiment, the HMD 102 includes microphones 204A and 204B defined on the front surface of the HMD 102, and microphone 204C defined on a side surface of the HMD 102. By utilizing an array of microphones, sound from each of the microphones can be processed to determine the location of the sound's source. This information can be utilized in various ways, including exclusion of unwanted sound sources, association of a sound source with a visual identification, etc.

The HMD 102 may also include one or more image capture devices. In the illustrated embodiment, the HMD 102 is shown to include image captured devices 202A and 202B. By utilizing a stereoscopic pair of image capture devices, three-dimensional (3D) images and video of the environment can be captured from the perspective of the HMD 102. Such video can be presented to the user to provide the user with a "video see-through" ability while wearing the HMD 102. That is, though the user cannot see through the HMD 102 in a strict sense, the video captured by the image capture devices 202A and 202B can nonetheless provide a functional equivalent of being able to see the environment external to the HMD 102 as if looking through the HMD 102. Such video can be augmented with virtual elements to provide an augmented reality experience, or may be combined or blended with virtual elements in other ways. Though in the illustrated embodiment, two cameras are shown on the front surface of the HMD 102, it will be appreciated that there may be any number of externally facing cameras installed on the HMD 102, oriented in any direction. For example, in another embodiment, there may be cameras mounted on the sides of the HMD 102 to provide additional panoramic image capture of the environment.

Figure 3:
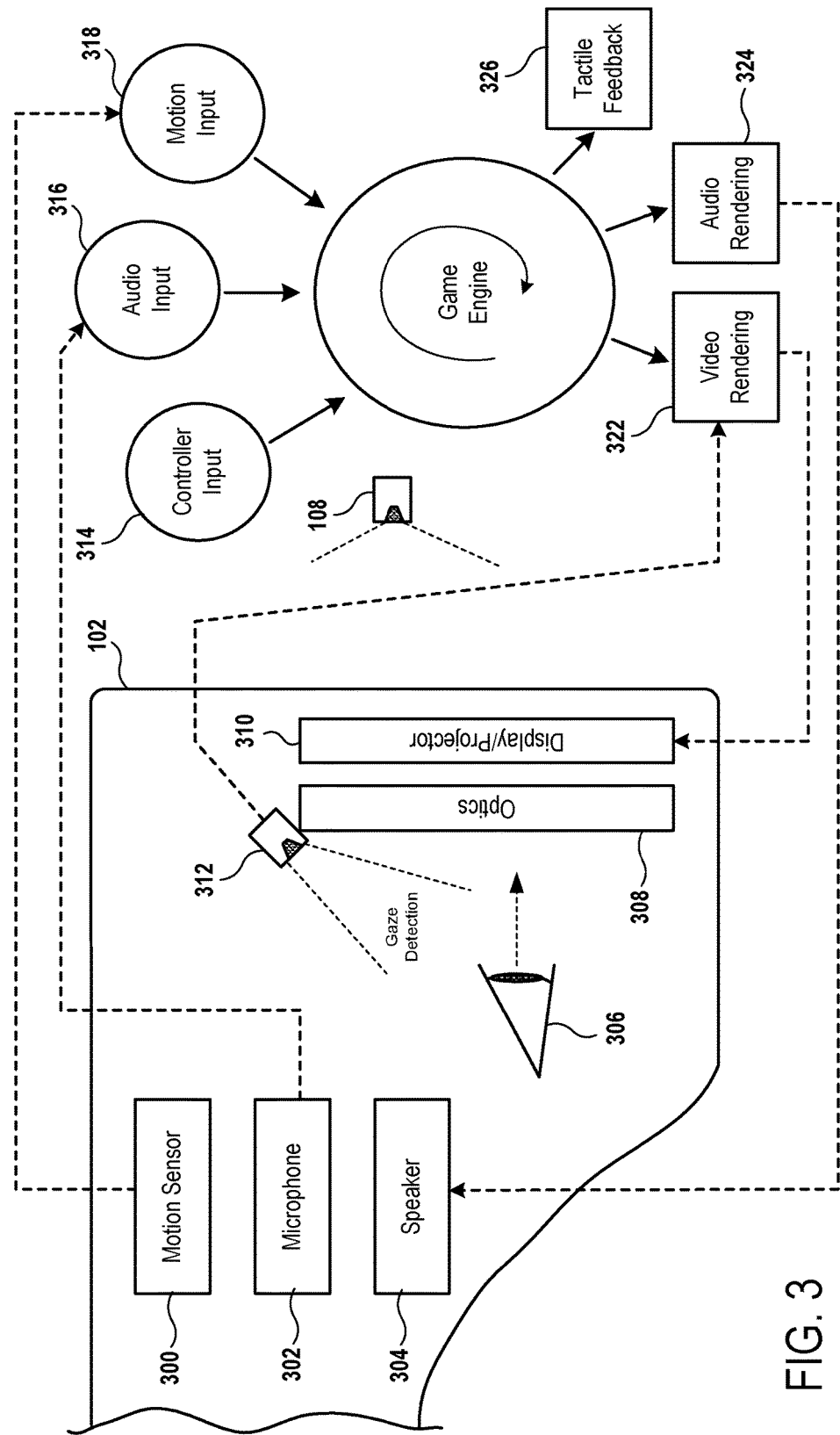
FIG. 3 conceptually illustrates the function of a HMD in conjunction with an executing video game, in accordance with an embodiment of the invention.

FIG. 3 conceptually illustrates the function of the HMD 102 in conjunction with an executing video game, in accordance with an embodiment of the invention. The executing video game is defined by a game engine 320 which receives inputs to update a game state of the video game. The game state of the video game can be defined, at least in part, by values of various parameters of the video game which define various aspects of the current gameplay, such as the presence and location of objects, the conditions of a virtual environment, the triggering of events, user profiles, view perspectives, etc.

In the illustrated embodiment, the game engine receives, by way of example, controller input 314, audio input 316 and motion input 318. The controller input 314 may be defined from the operation of a gaming controller separate from the HMD 102, such as controller 104. By way of example, controller input 314 may include directional inputs, button presses, trigger activation, movements, or other kinds of inputs processed from the operation of a gaming controller. The audio input 316 can be processed from a microphone 302 of the HMD 102, or from a microphone included in the image capture device 108. The motion input 218 can be processed from a motion sensor 300 included in the HMD 102, or from image capture device 108 as it captures images of the HMD 102. The game engine 320 receives inputs which are processed according to the configuration of the game engine to update the game state of the video game. The game engine 320 outputs game state data to various rendering modules which process the game state data to define content which will be presented to the user.

In the illustrated embodiment, a video rendering module 322 is defined to render a video stream for presentation on the HMD 102. The video stream may be presented by a display/projector mechanism 310, and viewed through optics 308 by the eye 306 of the user. An audio rendering module 304 is configured to render an audio stream for listening by the user. In one embodiment, the audio stream is output through a speaker 304 associated with the HMD 102. It should be appreciated that speaker 304 may take the form of an open air speaker, headphones, or any other kind of speaker capable of presenting audio.

In one embodiment, a gaze tracking camera 312 is included in the HMD 102 to enable tracking of the gaze of the user. The gaze tracking camera captures images of the user's eyes, which are analyzed to determine the gaze direction of the user. In one embodiment, information about the gaze direction of the user can be utilized to affect the video rendering. For example, if a user's eyes are determined to be looking a specific direction, then the video rendering for that direction can be prioritized or emphasized, such as by providing greater detail or faster updates in the region where the user is looking.

Additionally, a tactile feedback module 326 is configured to provide signals to tactile feedback hardware included in either the HMD 102 or another device operated by the user, such as a controller 104. The tactile feedback may take the form of various kinds of tactile sensations, such as vibration feedback, temperature feedback, pressure feedback, etc.

Figure 4:
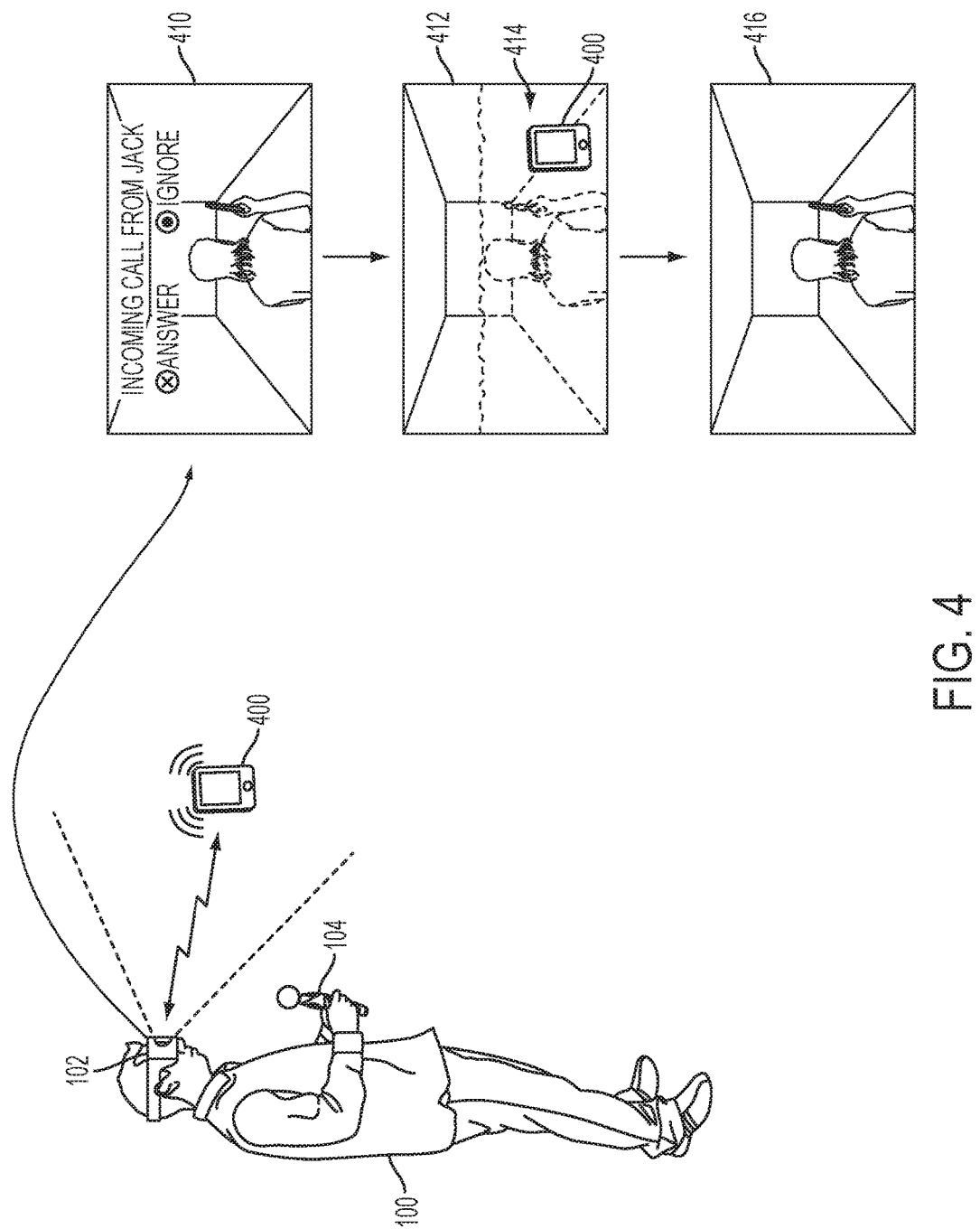
FIG. 4 illustrates a user wearing a head-mounted display that is paired with a mobile device, in accordance with an embodiment of the invention.

FIG. 4 illustrates a user wearing a head-mounted display that is paired with a mobile device, in accordance with an embodiment of the invention. In the illustrated embodiment, the mobile device 400 can be a cellular phone, though in other embodiments the mobile device may be any other kind of portable device which may be paired with another device. Furthermore, the mobile device may be paired directly with the HMD 102, or may be paired with a computer, such as computer 106, that communicates video and/or audio data to the HMD 102 for presentation. Regardless of the specific configuration, the result of pairing the mobile device 400 is such that features of the mobile device 400 (such as sending and receiving phone calls, accessing contacts, providing voice input/commands, etc.) are accessible from the HMD 102.

At reference 410, a view as provided by the HMD 102 to the user 100 is shown when an incoming call is received by the mobile device 400. As shown, a message indicating the incoming call is presented to the user, overlaid upon a virtual scene in which the user's gameplay is defined. In one embodiment, the user may indicate acceptance or rejection of the call by pressing specific buttons on the controller 104. In another embodiment, the HMD 102 includes one or more buttons which can be utilized in a similar manner. When the user accepts the incoming call, then as shown at reference 412, a video see-through portion 414 is shown in the view provided by the HMD 102. The video see-through portion 414 is provided by combining a video feed from an externally facing camera of the HMD 102 with the existing display of the virtual environment. Additionally, the video game may be paused upon the acceptance of the incoming call by the user 100.

In the illustrated embodiment, the lower portion of the displayed view presents the video feed, whereas the upper portion of the displayed view still shows the virtual environment. However, in other embodiments, the video see-through portion can be configured in any region or orientation of the displayed view, including the entirety of the view. The video see-through can be shown exclusive of any other content. Or in another embodiment, the video see-through can be mixed with the existing view of the virtual space. In one embodiment, the view of the virtual space becomes partially transparent or is otherwise reduced in intensity, and the video see-through is overlaid or mixed with at least a portion of the virtual space view. After the call is complete, then as shown at reference 416, the video see-through portion is eliminated and the view of the virtual space is restored By providing the video see-through portion 414, the user is able to view the mobile device 400. This allows the user 100 to access functionality provided on the mobile device 400 without having the remove the HMD 102. By way of example, the user 100 may wish to access functions of the mobile device such as adjusting volume, muting a call, access other apps on the mobile device, etc. Though the present embodiment is described with reference to an incoming phone call, similar concepts are contemplated for other types of communications via a mobile device. For example, receipt of a text message, e-mail, or other alert may trigger display of a message in the view provided by the HMD 102 alerting the user to the communication. And a video see-through may be provided in response to the receipt of the communication or some indication of positive acceptance by the user 100, so as to enable the user 100 to view the mobile device and access its functionality without having to remove the HMD 102 from his/her head.

Figure 5:
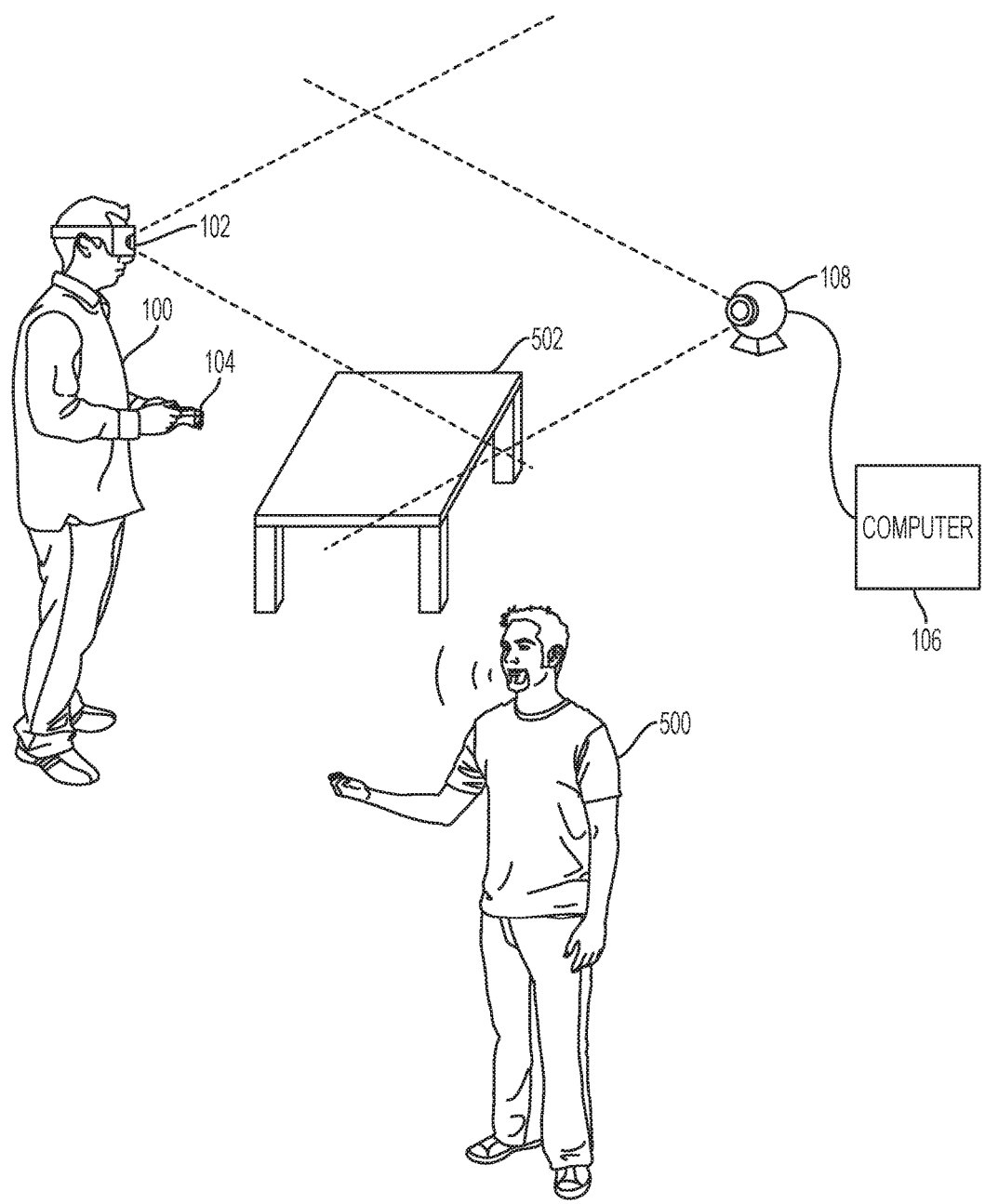
FIG. 5 illustrates an interactive environment having objects which may cause interruption to the gameplay of a user, in accordance with an embodiment of the invention.

FIG. 5 illustrates an interactive environment having objects which may cause interruption to the gameplay of a user, in accordance with an embodiment of the invention. For example, a person 500 may be speaking in the vicinity of the user 100, while the user 100 is engaged in gameplay of video game displayed on the HMD 102. In one embodiment, the user 100 may be alerted to the presence of person 500 speaking. The location of the person 500 can be identified based upon sound source localization and/or image recognition, utilizing audio and/or image data captured by the HMD 102 and/or the image capture device 108. In one embodiment, a voice recognition technology or image recognition technology can be utilized to determine the identity of the person 500. When the user is alerted to the presence of person 500 speaking, a video see-through mode can be activated and at least partially displayed on the HMD 102 to enable the user 100 to see the person 500 without removing the HMD 102.

Also shown at FIG. 5 is a table 502. In one embodiment, the user 100 can be warned if he is moving too close to an object such as table 502, and therefore at risk of bumping into the object. An alert can be displayed to the user via the HMD 102, and a video see-through mode can be activated to allow the user 100 to see external objects in his vicinity, such as the table 502. Objects in the local environment of the user 100 can be mapped based on image analysis of captured images by the HMD 102 or a separate image capture device 108. The multiple views of the environment can be processed to define a three-dimensional mapping of the objects in the vicinity of the user. Furthermore, the HMD 102 and/or the image capture device 108 can include depth cameras which capture depth information about the local environment. The depth information can be analyzed in support of defining the aforementioned three-dimensional mapping of objects in the user's vicinity.

Head-mounted displays can provide very immersive experiences, in part because they can provide display that encompasses a large portion of the user's field of view, if not its entirety. As such, the user can experience sensations of motion, acceleration, directional changes, and other types of physics by virtue of what is being watched, even though the user himself is not actually moving. Because a head-mounted display can provide a very immersive experience for the user, it can be disorienting for the user to abruptly transition from viewing a high intensity scene (possibly characterized by a high level of motion or high density of objects) to viewing a halted scene (such as when a game is paused) or a different scene entirely. In the following figures, several examples are provided wherein the intensity of gameplay of a video game is progressively reduced so as to transition gameplay from a higher intensity to a lower intensity, and so minimize disorientation of the user resulting from transitioning.

Figure 6A:
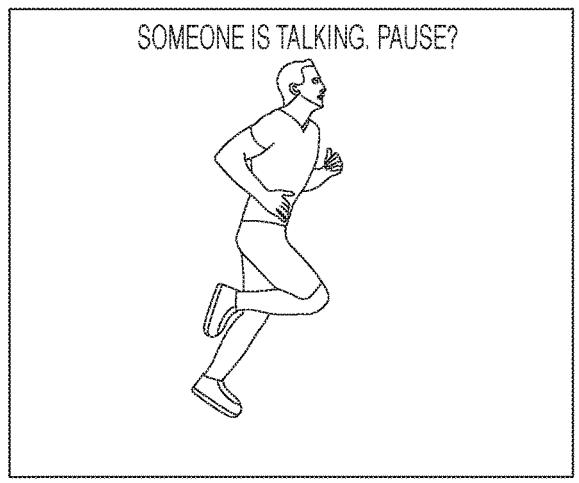
FIGS. 6A, 6B, and 6C illustrate views of a video game presented on an HMD, in accordance with an embodiment of the invention.
Figure 6B:
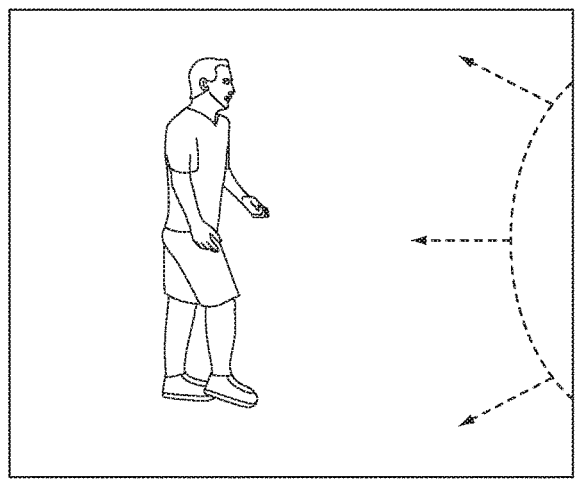

FIG. 6A illustrates a view of a video game scene presented on an HMD in which a character is running. As the character is running, the scene displayed (defined by a virtual viewpoint) is moved to follow the character, and so the view provides the sensation of this movement to the user viewing via the HMD. However, another person has been identified as talking in the vicinity of the user. A message is shown indicating that someone is talking, and an option to pause gameplay is presented. If the user opts to pause the gameplay, the movement of the character is progressively slowed until the character has stopped, as shown at FIG. 6B.

Figure 6C:
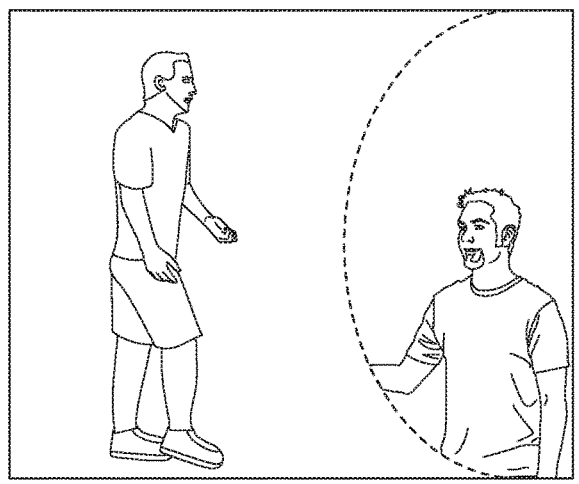

In one embodiment, a video see-through portion opens within the user's view from the direction in which the other person is located. As noted previously, the location of the other person can be determined based on sound localization and image analysis/recognition. As shown at FIG. 6C, the video see-through portion has opened from the right side of the view, to reveal the other person talking.

Figure 7A:
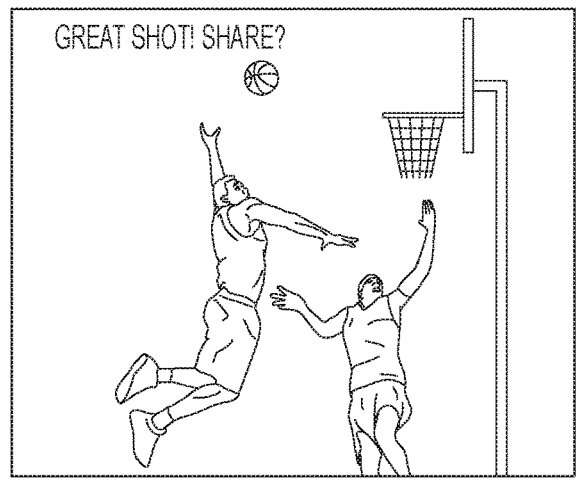
FIGS. 7A, 7B, and 7C illustrate views of a video game presented on an HMD, in accordance with an embodiment of the invention.
Figure 7B:
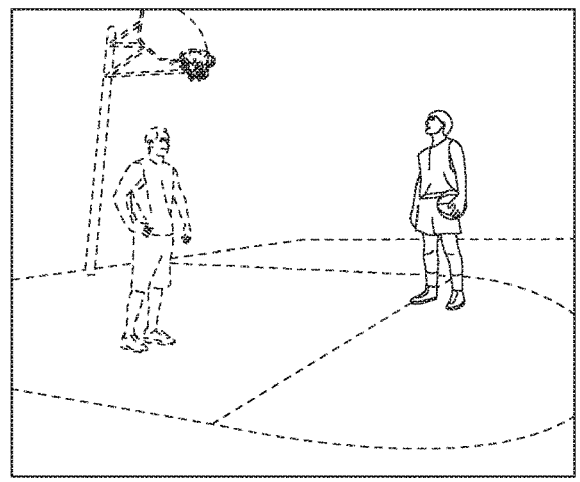

FIG. 7A illustrates a view of a video game presented through a HMD, in accordance with an embodiment of the invention. In the view shown at FIG. 7A, the user is playing a basketball game, and has just scored a basket. An option is presented for the user to share a clip of the basketball shot, by way of example, on a social network. However, the gameplay of the basketball video game can be intense with many players moving simultaneously on a basketball court. Therefore, if the user chooses to share the preceding shot as suggested, then the intensity of the gameplay is progressively reduced. By way of example, in the context of the basketball game, players may stop moving, or may be removed from the scene, and visual elements may be simplified or may also be removed from the scene. As shown at FIG. 7B, the players have stopped moving, and certain visual elements have been removed from the scene, such as one of the players and some floor markings. In this manner, the scene is simplified and the intensity of the game is reduced prior to transitioning away from the gameplay.

Figure 7C:
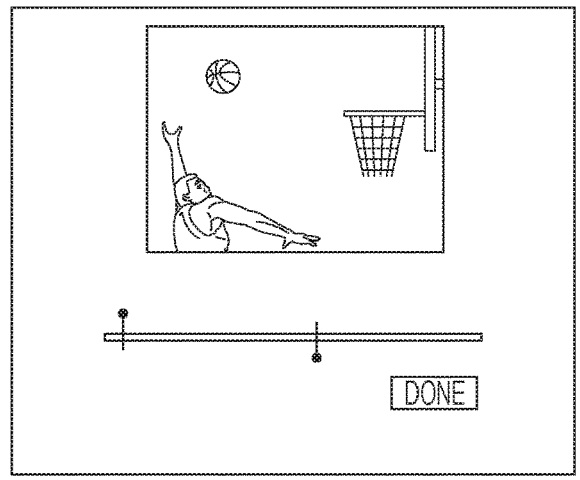

After the intensity of gameplay is reduced, then as shown at FIG. 7C, an interface is presented for selecting the start and end points for the video clip of the basketball shot to be shared.

Figure 8A:
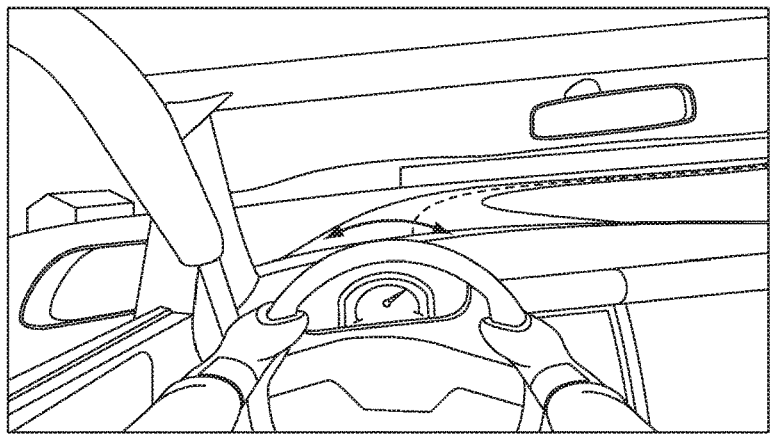
FIGS. 8A, 8B, and 8C illustrate views of a video game presented on an HMD, in accordance with an embodiment of the invention.
Figure 8B:
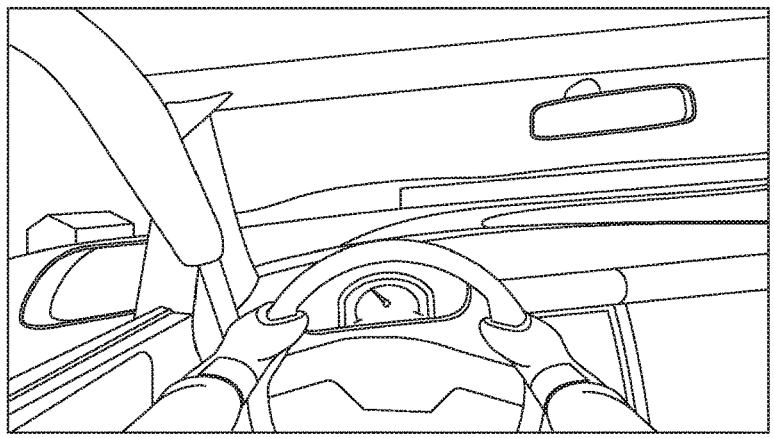
Figure 8C:
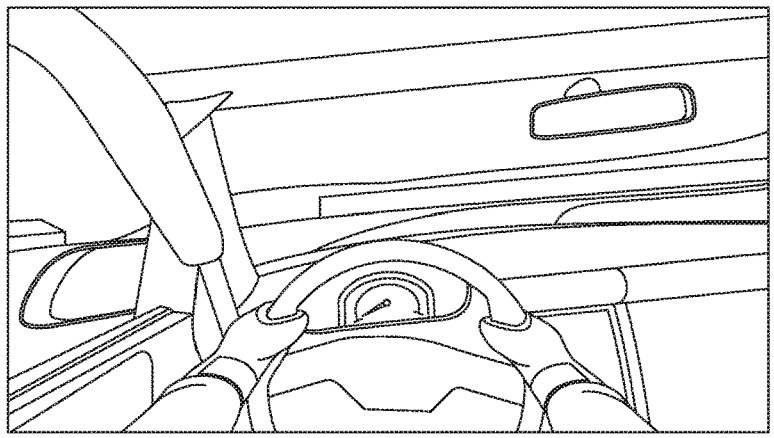

FIGS. 8A, 8B, and 8C illustrate views of a car racing game, in accordance with an embodiment of the invention. At FIG. 8A, the user is driving a car at high velocity in the context of the video game. Prior to transitioning out of the game, as shown at FIG. 8B, the speed of the car is reduced. And as shown at FIG. 8C, the car has come to a stop. Thus, the car has transitioned to a stop before the display of the scene is removed, or the user transfers to viewing another scene in the HMD.

Figure 9A:
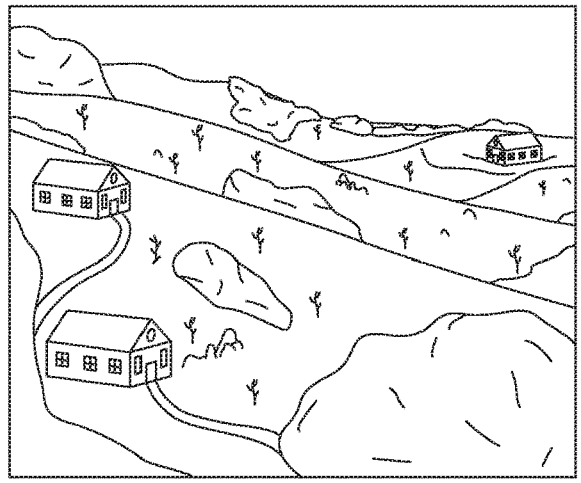
FIGS. 9A, 9B, and 9C illustrate views of a video game presented on an HMD, in accordance with an embodiment of the invention.
Figure 9B:
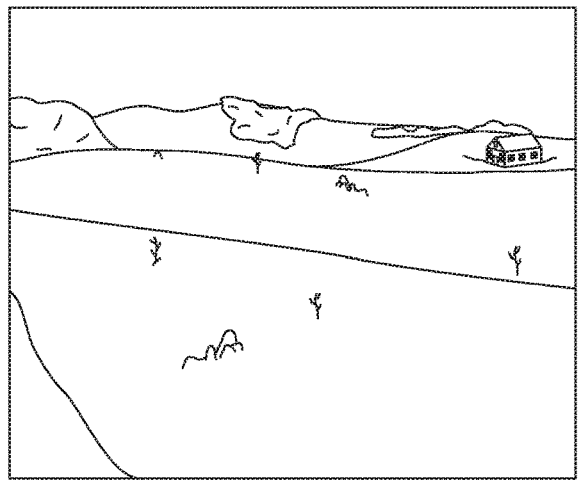
Figure 9C:
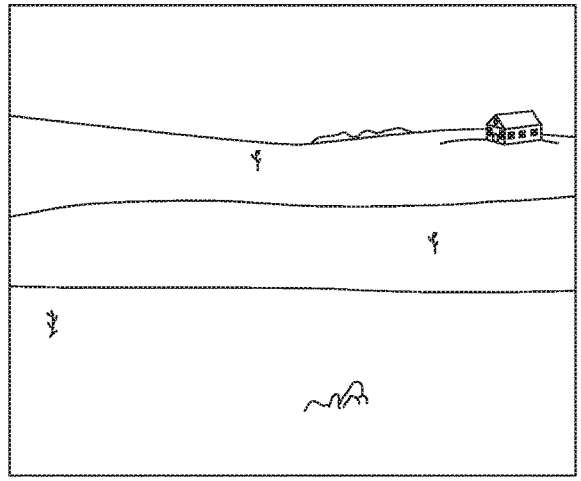

FIGS. 9A, 9B, and 9C illustrate views of a virtual scene, in accordance with an embodiment of the invention. At FIG. 9A, a hilly scene with a high density of objects (e.g. trees) is shown. Prior to transitioning away from the scene, as shown at FIG. 9B, the density of objects in the scene is reduced, simplifying the presentation of the scene. Additionally, the hilliness of the terrain has been reduced. At FIG. 9C, all objects have been removed from the scene, and the terrain has been further simplified to a nearly flat terrain. In this manner, the graphics presented to the user have been simplified prior to transitioning away from the virtual scene.

As the foregoing examples demonstrate, a reduction in the intensity of the gameplay of a game can be associated with a variety of aspects of the video game. The foregoing embodiments have generally been described in terms of aspects such as velocity and density of objects. However, it is contemplated that other aspects of gameplay which contribute to the overall intensity of gameplay can be similarly reduced in a progressive manner when transitioning. For example, aspects such as changes in velocity (acceleration), changes in density, sound (e.g. density, volume, amplitude of certain frequency ranges, variance over time), color (e.g. saturation, intensity), contrast, brightness, transparency, complexity of graphics, etc. can all be adjusted to reduce the intensity of a video game prior to transitioning to a paused state or other state of operation.

As abrupt transitioning out of an immersive experience provided on a HMD can be disorienting, so can abrupt transitioning in to such an immersive experience. Therefore, intensity of gameplay can be progressively increased when active gameplay is initiated.

Figure 10:
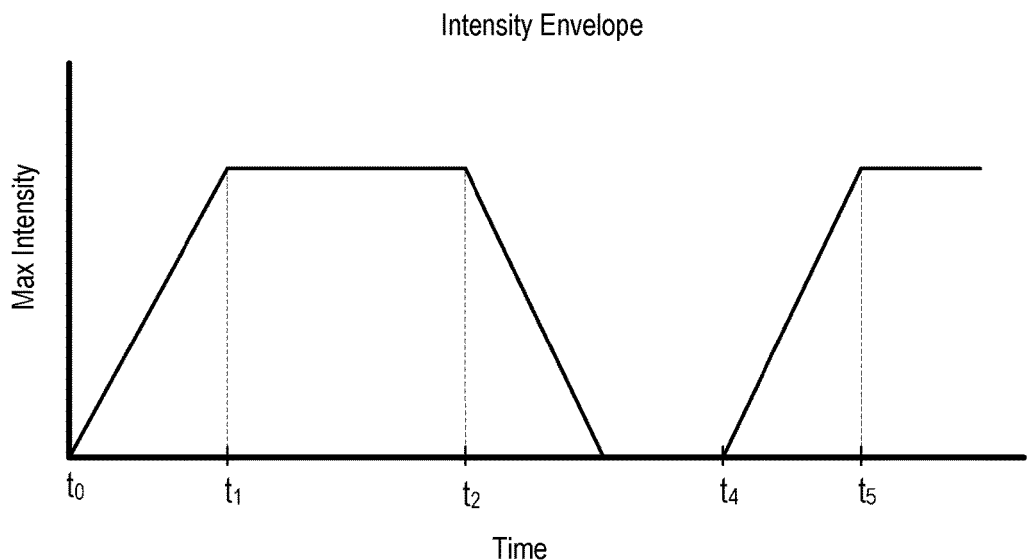
FIG. 10 illustrates a graph showing a maximum allowable intensity of gameplay over time, in accordance with an embodiment of the invention.

FIG. 10 illustrates a graph showing a maximum allowable intensity of gameplay over time, in accordance with an embodiment of the invention. At time t0, gameplay is initiated, and the maximum allowable intensity of gameplay is ramped up progressively until it reaches an upper limit defined at time t1. Accordingly, the actual gameplay intensity experienced by the user may progressively increase during this time, depending upon the specific nature of the user's gameplay. In one embodiment, gameplay actions on the part of the user which result in gameplay intensity below the maximum allowable intensity may be permitted, whereas gameplay actions which would otherwise result in gameplay intensity above the maximum allowable intensity are limited or down-regulated to the maximum allowable intensity defined for that time. In another embodiment, the gameplay intensity resulting from gameplay actions is scaled to fit the maximum allowable intensity defined for that time. It should be appreciated that the scaling of the gameplay intensity to fit the maximum allowable intensity can define a linear scaling relationship or some other non-linear scaling relationship. In this regard, in one embodiment, the maximum allowable intensity is defined by a scaling factor being applied to gameplay intensity resulting from gameplay actions.

Explanation of some numerical examples will serve to illustrate the foregoing relationships. For example, if gameplay activity results in a gameplay intensity having a numerical value ranging from 1-10, and the maximum allowable intensity is 5, then in one embodiment, gameplay intensities ranging from 1-5 are allowed, whereas gameplay intensities ranging from 5-10 are adjusted to the maximum allowable intensity, which is 5. In another embodiment, a scalar factor of 0.5 is applied to all gameplay intensities, so that the gameplay intensity range of 1-10 is now effectively reduced to a range of 1-5, and also thereby defining the maximum allowable intensity. It should be appreciated that the foregoing numerical examples are provided merely by way of example. In various embodiments, the scalar factor may range from zero to one, or expressed as a percentage, the scalar factor may range from 0% to 100%, so as to define an effective gameplay intensity of some aspect of gameplay. It will be appreciated that the scalar factor can be adjusted upward or downward depending upon various factors, such as the experience level of the user.

With continued reference to FIG. 10, the upper limit in the maximum allowable intensity is maintained from time t1 until time t2, whereupon an interruption to the gameplay occurs and a command is received to pause the gameplay. At this point, before entering a paused state of gameplay, the maximum allowable intensity is progressively reduced to zero at time t3. This will have the effect of reducing the actual intensity of gameplay to zero. By way of example, between time t3 and t4, the video game may be in a paused state. At time t4, the gameplay is reinitiated and so the maximum allowable intensity is again ramped up. At time t5, the maximum intensity level reaches an upper limit again.

As applied in the context of a given video game, the progressive increase or decrease in the gameplay intensity or maximum allowable intensity can result in various effects experienced by the user. For example, the user may experience a gradual increase or decrease in the sensitivity of a given input, such as motion input, or a controller input such as a joystick or button activation. Or changes in the view provided to the user via the HMD resulting in sensations of acceleration, deceleration, velocity, or changes in direction may be progressively increased or decreased, resulting in corresponding increases or decreases in these sensations.

The maximum allowable intensity defined over time, as has been described, defines a maximum intensity envelope for the user. It should be appreciated that the provision of a maximum intensity envelope as has been described permits the user to acclimatize to the intensity and immersive nature of the gameplay in a gradual and progressive manner. This can help the user to avoid discomforting sensations of disorientation, vertigo, and the like when transitioning into and out of active gameplay.

In one embodiment, the gameplay intensity can be manually adjusted by the user, prior to or during active gameplay. The adjustment of the gameplay intensity can be defined by a user-adjustable setting that can be increased or decreased in response to corresponding commands from the user. It will be appreciated that any type of command interface for adjusting the setting can be employed, including buttons, voice commands, gestures, etc. Furthermore, the user-adjustable setting can be defined by a parameter for a property of the gameplay intensity, such as the aforementioned maximum allowable intensity and scaling factor, or other properties of the gameplay intensity that may effectively increase or decrease the overall gameplay intensity for the user.

It will be appreciated that a gameplay intensity can be defined by a game in accordance with the context of the game, and may further be defined to affect any of a variety of aspects of gameplay. Additionally, during different portions of a game, the gameplay intensity can be defined by different aspects that are relevant during the different portions of the game. For example, in one embodiment, intensity may be defined as the amount of damage dealt by and received by characters in the game (e.g. a user's character, an enemy character, a boss character, etc.). Thus, as a user transitions into or out of gameplay, a user's character may both deliver damage to another character and sustain damage from another character; however, the amount of damage delivered/sustained may be reduced during the transition. In this manner, a user's character will not die too quickly when transitioning into or out of a paused state during the course of combat.

It should be appreciated that the gameplay intensity may be defined by any of a variety of adjustable aspects of gameplay, without limitation, including the following: an amount of damage delivered, a strength of an attack or weapon, an amount of energy or resource utilized, an amount of health depleted, a level of difficulty, a frequency of an action, an effectiveness of an action, etc. The specific aspect of gameplay that is affected by changes to the gameplay intensity may be contextually specific to a given game and to the gameplay activity ongoing at the time the gameplay intensity is changed.

Figure 11:
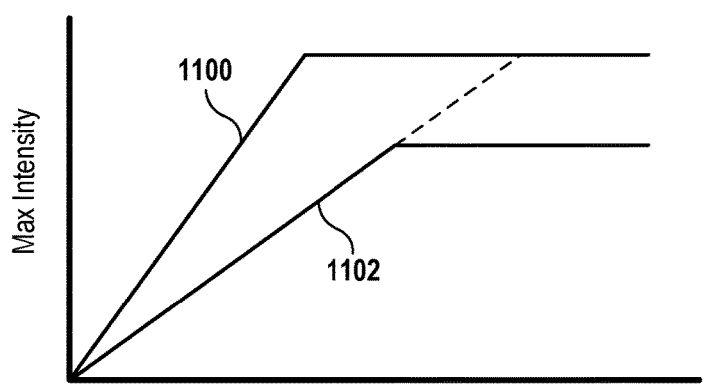
FIG. 11 illustrates two curves of maximum intensity associated with two different users, in accordance with an embodiment of the invention.

FIG. 11 illustrates two curves of maximum intensity associated with two different users, in accordance with an embodiment of the invention. The curve 1100 shows the maximum intensity level for a more experienced user, whereas the curve 1102 shows the maximum intensity level for a less experienced user. As can be seen, the maximum intensity level for the more experienced user progressively ramps up and ramps down more quickly than that of the less experienced user. This reflects the fact that the more experienced user is better able to handle a faster transition between high and low intensities of gameplay. Additionally, in the illustrated embodiment, the curve 1100 of the experienced user exhibits a higher upper limit than that of curve 1102. However, in another embodiment, the curve 1102 associated with the less experienced user may reach the same upper limit, but more gradually.

In one embodiment, various users may have associated user profiles which define the rates at which the user may increase or decrease in intensity of gameplay when transitioning into and out of active gameplay, as well as the upper limit of the intensity of gameplay. As discussed above, these parameters can be defined by scalar factors applied to the intensity of gameplay. In one embodiment, when a user is logged in to the video game system, their profile is accessed to define the gameplay intensity presented to the user. Additionally, it will be noted that the profile may be based on the experience of the user, as well as user-defined settings. The experience of the user can be based on the amount of time the user has spent playing the video game or using the HMD, as well as the recency of such gameplay. In one embodiment, the rate at which a user may change (increase or decrease) gameplay intensity increases as the amount of time spent in active gameplay increases. In one embodiment, this rate may be configured to decrease if an amount of time since the user's previous gameplay session exceeds a certain threshold. Furthermore, once the threshold time period is exceeded, the rate may further decrease as the time period since the previous session increases. In this manner, a user who has not engaged in active gameplay for some time, may not be subjected to the same rate of intensity change as during his previous session, and is permitted to acclimatize to the intensity of gameplay more gradually.

Figure 12:
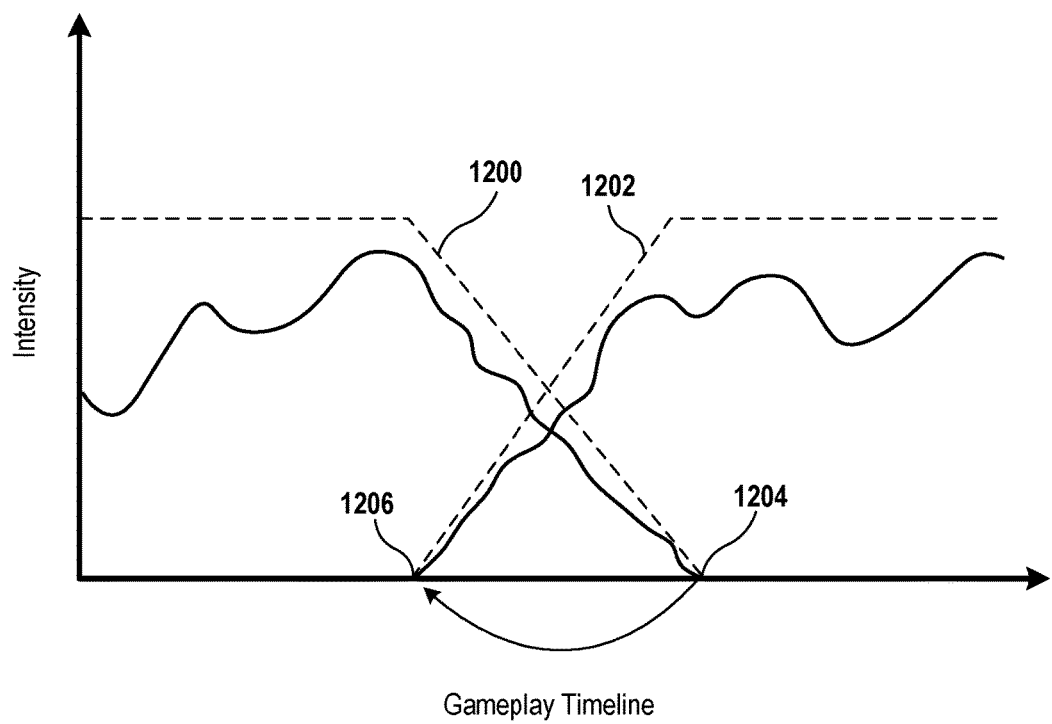
FIG. 12 illustrates a graph showing intensity versus a gameplay timeline, in accordance with an embodiment of the invention.

FIG. 12 illustrates a graph showing intensity versus a gameplay timeline, in accordance with an embodiment of the invention. The intensity of a user's gameplay over the course of a gameplay timeline is shown. The user's gameplay intensity ramps down in accordance with curve 1200, until it stops along the gameplay timeline at reference 1204. However, when gameplay is resumed, it is initiated from an earlier timepoint in the gameplay timeline, indicated at reference 1206. In this manner, context is provided for the user to reenter the gameplay of the video game when the user decides to resume active gameplay.

Various embodiments described herein have been described with reference to video games presented on a head-mounted display device. However, it will be appreciated that in accordance with other embodiments, the principles and methods thus described may also be applied in the context of other types of interactive applications, and in the context of presentation on other types of devices, including but not limited to televisions and other types of displays on which interactive applications may be presented.

Figure 13:
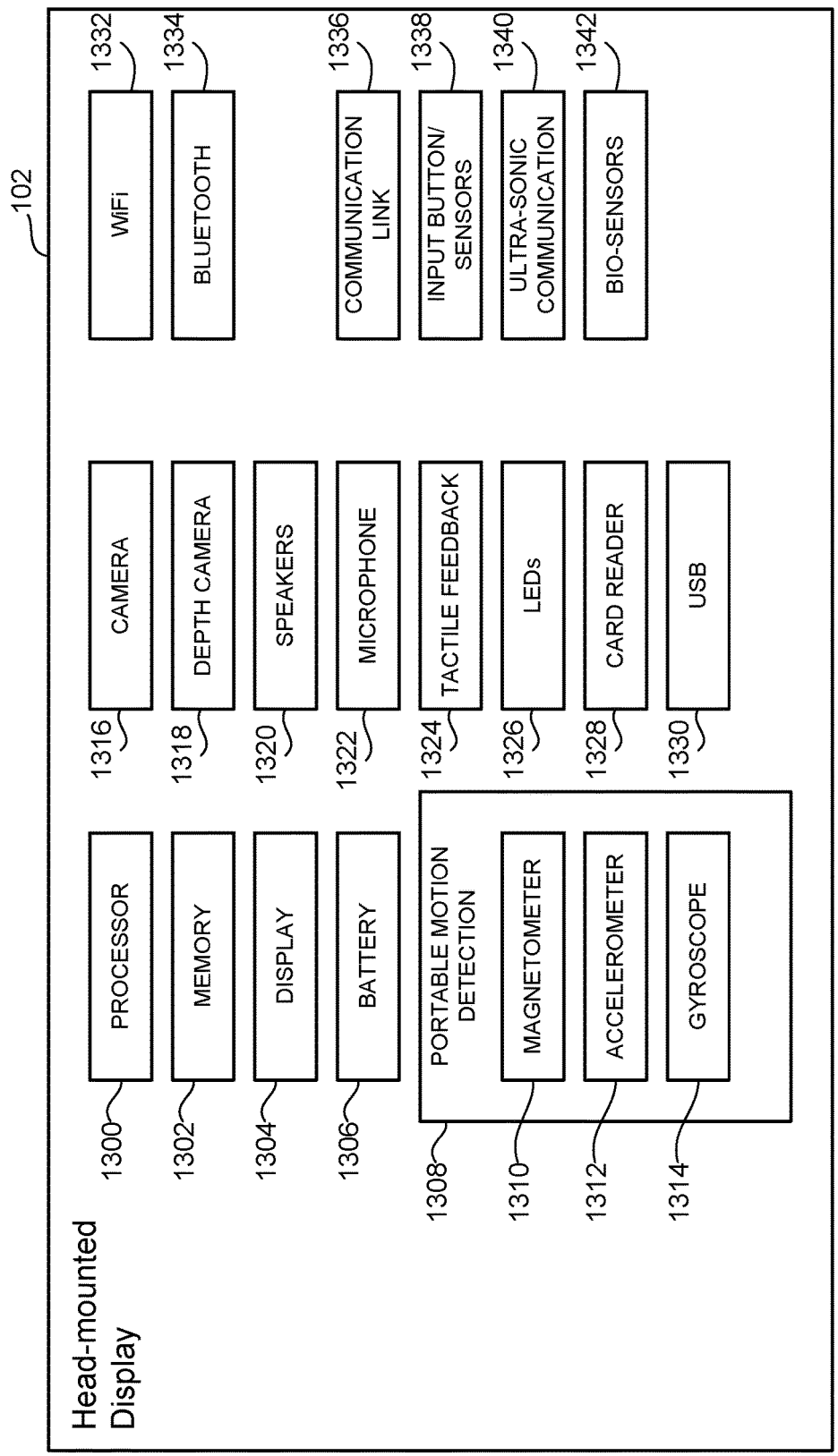
FIG. 13 illustrates components of a head-mounted display, in accordance with an embodiment of the invention.

With reference to FIG. 13, a diagram illustrating components of a head-mounted display 102 is shown, in accordance with an embodiment of the invention. The head-mounted display 102 includes a processor 1300 for executing program instructions. A memory 1302 is provided for storage purposes, and may include both volatile and non-volatile memory. A display 1304 is included which provides a visual interface that a user may view. A battery 1306 is provided as a power source for the head-mounted display 102. A motion detection module 1308 may include any of various kinds of motion sensitive hardware, such as a magnetometer 1310, an accelerometer 1312, and a gyroscope 1314.

An accelerometer is a device for measuring acceleration and gravity induced reaction forces. Single and multiple axis models are available to detect magnitude and direction of the acceleration in different directions. The accelerometer is used to sense inclination, vibration, and shock. In one embodiment, three accelerometers 1312 are used to provide the direction of gravity, which gives an absolute reference for two angles (world-space pitch and world-space roll).

A magnetometer measures the strength and direction of the magnetic field in the vicinity of the head-mounted display. In one embodiment, three magnetometers 1310 are used within the head-mounted display, ensuring an absolute reference for the world-space yaw angle. In one embodiment, the magnetometer is designed to span the earth magnetic field, which is ±80 microtesla. Magnetometers are affected by metal, and provide a yaw measurement that is monotonic with actual yaw. The magnetic field may be warped due to metal in the environment, which causes a warp in the yaw measurement. If necessary, this warp can be calibrated using information from other sensors such as the gyroscope or the camera. In one embodiment, accelerometer 1312 is used together with magnetometer 1310 to obtain the inclination and azimuth of the head-mounted display 102.

A gyroscope is a device for measuring or maintaining orientation, based on the principles of angular momentum. In one embodiment, three gyroscopes 1314 provide information about movement across the respective axis (x, y and z) based on inertial sensing. The gyroscopes help in detecting fast rotations. However, the gyroscopes can drift overtime without the existence of an absolute reference. This requires resetting the gyroscopes periodically, which can be done using other available information, such as positional/orientation determination based on visual tracking of an object, accelerometer, magnetometer, etc.

A camera 1316 is provided for capturing images and image streams of a real environment. More than one camera may be included in the head-mounted display 102, including a camera that is rear-facing (directed away from a user when the user is viewing the display of the head-mounted display 102), and a camera that is front-facing (directed towards the user when the user is viewing the display of the head-mounted display 102). Additionally, a depth camera 1318 may be included in the head-mounted display 102 for sensing depth information of objects in a real environment.

The head-mounted display 102 includes speakers 1320 for providing audio output. Also, a microphone 1322 may be included for capturing audio from the real environment, including sounds from the ambient environment, speech made by the user, etc. The head-mounted display 102 includes tactile feedback module 1324 for providing tactile feedback to the user. In one embodiment, the tactile feedback module 1324 is capable of causing movement and/or vibration of the head-mounted display 102 so as to provide tactile feedback to the user.

LEDs 1326 are provided as visual indicators of statuses of the head-mounted display 102. For example, an LED may indicate battery level, power on, etc. A card reader 1328 is provided to enable the head-mounted display 102 to read and write information to and from a memory card. A USB interface 1330 is included as one example of an interface for enabling connection of peripheral devices, or connection to other devices, such as other portable devices, computers, etc. In various embodiments of the head-mounted display 102, any of various kinds of interfaces may be included to enable greater connectivity of the head-mounted display 102.

A WiFi module 1332 is included for enabling connection to the Internet via wireless networking technologies. Also, the head-mounted display 102 includes a Bluetooth module 1334 for enabling wireless connection to other devices. A communications link 1336 may also be included for connection to other devices. In one embodiment, the communications link 1336 utilizes infrared transmission for wireless communication. In other embodiments, the communications link 1336 may utilize any of various wireless or wired transmission protocols for communication with other devices.

Input buttons/sensors 1338 are included to provide an input interface for the user. Any of various kinds of input interfaces may be included, such as buttons, touchpad, joystick, trackball, etc. An ultra-sonic communication module 1340 may be included in head-mounted display 102 for facilitating communication with other devices via ultra-sonic technologies.

Bio-sensors 1342 are included to enable detection of physiological data from a user. In one embodiment, the bio-sensors 1342 include one or more dry electrodes for detecting bio-electric signals of the user through the user's skin.

The foregoing components of head-mounted display 102 have been described as merely exemplary components that may be included in head-mounted display 102. In various embodiments of the invention, the head-mounted display 102 may or may not include some of the various aforementioned components. Embodiments of the head-mounted display 102 may additionally include other components not presently described, but known in the art, for purposes of facilitating aspects of the present invention as herein described.

It will be appreciated by those skilled in the art that in various embodiments of the invention, the aforementioned handheld device may be utilized in conjunction with an interactive application displayed on a display to provide various interactive functions. The exemplary embodiments described herein are provided by way of example only, and not by way of limitation.

Figure 14:
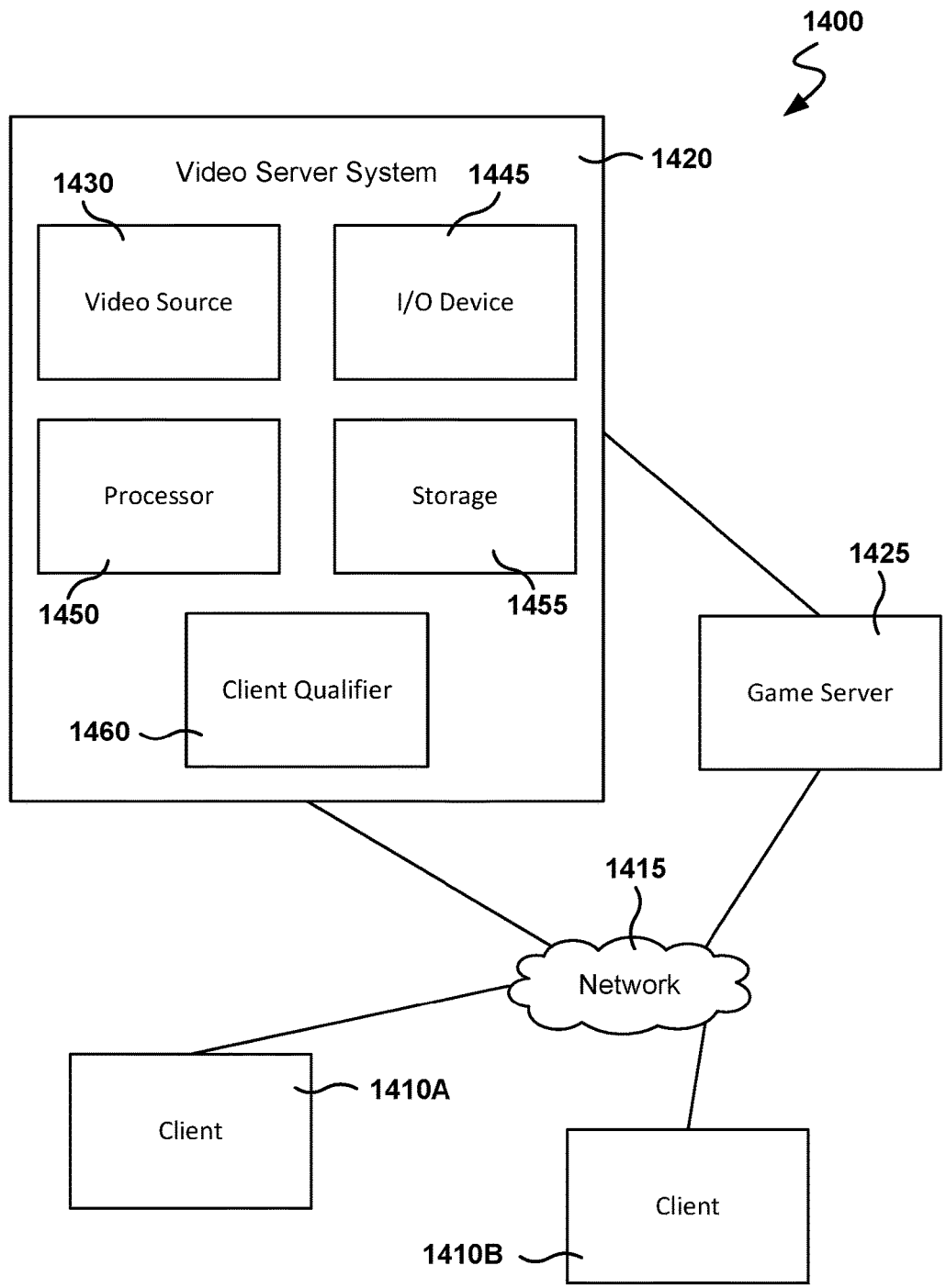
FIG. 14 is a block diagram of a Game System, according to various embodiments of the invention.

FIG. 14 is a block diagram of a Game System 1400, according to various embodiments of the invention. Game System 1400 is configured to provide a video stream to one or more Clients 1410 via a Network 1415. Game System 1400 typically includes a Video Server System 1420 and an optional game server 1425. Video Server System 1420 is configured to provide the video stream to the one or more Clients 1410 with a minimal quality of service. For example, Video Server System 1420 may receive a game command that changes the state of or a point of view within a video game, and provide Clients 1410 with an updated video stream reflecting this change in state with minimal lag time. The Video Server System 1420 may be configured to provide the video stream in a wide variety of alternative video formats, including formats yet to be defined. Further, the video stream may include video frames configured for presentation to a user at a wide variety of frame rates. Typical frame rates are 30 frames per second, 60 frames per second, and 1420 frames per second. Although higher or lower frame rates are included in alternative embodiments of the invention.

Clients 1410, referred to herein individually as 1410A, 1410B, etc., may include head mounted displays, terminals, personal computers, game consoles, tablet computers, telephones, set top boxes, kiosks, wireless devices, digital pads, stand-alone devices, handheld game playing devices, and/or the like. Typically, Clients 1410 are configured to receive encoded video streams, decode the video streams, and present the resulting video to a user, e.g., a player of a game. The processes of receiving encoded video streams and/or decoding the video streams typically includes storing individual video frames in a receive buffer of the client. The video streams may be presented to the user on a display integral to Client 1410 or on a separate device such as a monitor or television. Clients 1410 are optionally configured to support more than one game player. For example, a game console may be configured to support two, three, four or more simultaneous players. Each of these players may receive a separate video stream, or a single video stream may include regions of a frame generated specifically for each player, e.g., generated based on each player's point of view. Clients 1410 are optionally geographically dispersed. The number of clients included in Game System 1400 may vary widely from one or two to thousands, tens of thousands, or more. As used herein, the term "game player" is used to refer to a person that plays a game and the term "game playing device" is used to refer to a device used to play a game. In some embodiments, the game playing device may refer to a plurality of computing devices that cooperate to deliver a game experience to the user. For example, a game console and an HMD may cooperate with the video server system 1420 to deliver a game viewed through the HMD. In one embodiment, the game console receives the video stream from the video server system 1420, and the game console forwards the video stream, or updates to the video stream, to the HMD for rendering.

Clients 1410 are configured to receive video streams via Network 1415. Network 1415 may be any type of communication network including, a telephone network, the Internet, wireless networks, powerline networks, local area networks, wide area networks, private networks, and/or the like. In typical embodiments, the video streams are communicated via standard protocols, such as TCP/IP or UDP/IP. Alternatively, the video streams are communicated via proprietary standards.

A typical example of Clients 1410 is a personal computer comprising a processor, non-volatile memory, a display, decoding logic, network communication capabilities, and input devices. The decoding logic may include hardware, firmware, and/or software stored on a computer readable medium. Systems for decoding (and encoding) video streams are well known in the art and vary depending on the particular encoding scheme used.

Clients 1410 may, but are not required to, further include systems configured for modifying received video. For example, a client may be configured to perform further rendering, to overlay one video image on another video image, to crop a video image, and/or the like. For example, Clients 1410 may be configured to receive various types of video frames, such as I-frames, P-frames and B-frames, and to process these frames into images for display to a user. In some embodiments, a member of Clients 1410 is configured to perform further rendering, shading, conversion to 3-D, or like operations on the video stream. A member of Clients 1410 is optionally configured to receive more than one audio or video stream. Input devices of Clients 1410 may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

The video stream (and optionally audio stream) received by Clients 1410 is generated and provided by Video Server System 1420. As is described further elsewhere herein, this video stream includes video frames (and the audio stream includes audio frames). The video frames are configured (e.g., they include pixel information in an appropriate data structure) to contribute meaningfully to the images displayed to the user. As used herein, the term "video frames" is used to refer to frames including predominantly information that is configured to contribute to, e.g. to effect, the images shown to the user. Most of the teachings herein with regard to "video frames" can also be applied to "audio frames."

Clients 1410 are typically configured to receive inputs from a user. These inputs may include game commands configured to change the state of the video game or otherwise affect game play. The game commands can be received using input devices and/or may be automatically generated by computing instructions executing on Clients 1410. The received game commands are communicated from Clients 1410 via Network 1415 to Video Server System 1420 and/or Game Server 1425. For example, in some embodiments, the game commands are communicated to Game Server 1425 via Video Server System 1420. In some embodiments, separate copies of the game commands are communicated from Clients 1410 to Game Server 1425 and Video Server System 1420. The communication of game commands is optionally dependent on the identity of the command Game commands are optionally communicated from Client 1410A through a different route or communication channel that that used to provide audio or video streams to Client 1410A.

Game Server 1425 is optionally operated by a different entity than Video Server System 1420. For example, Game Server 1425 may be operated by the publisher of a multi-player game. In this example, Video Server System 1420 is optionally viewed as a client by Game Server 1425 and optionally configured to appear from the point of view of Game Server 1425 to be a prior art client executing a prior art game engine. Communication between Video Server System 1420 and Game Server 1425 optionally occurs via Network 1415. As such, Game Server 1425 can be a prior art multiplayer game server that sends game state information to multiple clients, one of which is game server system 1420. Video Server System 1420 may be configured to communicate with multiple instances of Game Server 1425 at the same time. For example, Video Server System 1420 can be configured to provide a plurality of different video games to different users. Each of these different video games may be supported by a different Game Server 1425 and/or published by different entities. In some embodiments, several geographically distributed instances of Video Server System 1420 are configured to provide game video to a plurality of different users. Each of these instances of Video Server System 1420 may be in communication with the same instance of Game Server 1425. Communication between Video Server System 1420 and one or more Game Server 1425 optionally occurs via a dedicated communication channel. For example, Video Server System 1420 may be connected to Game Server 1425 via a high bandwidth channel that is dedicated to communication between these two systems.

Video Server System 1420 comprises at least a Video Source 1430, an I/O Device 1445, a Processor 1450, and non-transitory Storage 1455. Video Server System 1420 may include one computing device or be distributed among a plurality of computing devices. These computing devices are optionally connected via a communications system such as a local area network.

Video Source 1430 is configured to provide a video stream, e.g., streaming video or a series of video frames that form a moving picture. In some embodiments, Video Source 1430 includes a video game engine and rendering logic. The video game engine is configured to receive game commands from a player and to maintain a copy of the state of the video game based on the received commands. This game state includes the position of objects in a game environment, as well as typically a point of view. The game state may also include properties, images, colors and/or textures of objects. The game state is typically maintained based on game rules, as well as game commands such as move, turn, attack, set focus to, interact, use, and/or the like. Part of the game engine is optionally disposed within Game Server 1425. Game Server 1425 may maintain a copy of the state of the game based on game commands received from multiple players using geographically disperse clients. In these cases, the game state is provided by Game Server 1425 to Video Source 1430, wherein a copy of the game state is stored and rendering is performed. Game Server 1425 may receive game commands directly from Clients 1410 via Network 1415, and/or may receive game commands via Video Server System 1420.

Video Source 1430 typically includes rendering logic, e.g., hardware, firmware, and/or software stored on a computer readable medium such as Storage 1455. This rendering logic is configured to create video frames of the video stream based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually encoded prior to communication to Clients 1410. For example, the raw video may be encoded according to an Adobe Flash® standard, .wav, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a remote device. The video stream is characterized by a frame size and a frame rate. Typical frame sizes include 800×600, 1280×720 (e.g., 720p), 1024×768, although any other frame sizes may be used. The frame rate is the number of video frames per second. A video stream may include different types of video frames. For example, the H.264 standard includes a "P" frame and a "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In alternative embodiments Video Source 1430 includes a video recording device such as a camera. This camera may be used to generate delayed or live video that can be included in the video stream of a computer game. The resulting video stream, optionally includes both rendered images and images recorded using a still or video camera. Video Source 1430 may also include storage devices configured to store previously recorded video to be included in a video stream. Video Source 1430 may also include motion or positioning sensing devices configured to detect motion or position of an object, e.g., person, and logic configured to determine a game state or produce video-based on the detected motion and/or position.

Video Source 1430 is optionally configured to provide overlays configured to be placed on other video. For example, these overlays may include a command interface, log in instructions, messages to a game player, images of other game players, video feeds of other game players (e.g., webcam video). In embodiments of Client 1410A including a touch screen interface or a gaze detection interface, the overlay may include a virtual keyboard, joystick, touch pad, and/or the like. In one example of an overlay a player's voice is overlaid on an audio stream. Video Source 1430 optionally further includes one or more audio sources.

In embodiments wherein Video Server System 1420 is configured to maintain the game state based on input from more than one player, each player may have a different point of view comprising a position and direction of view. Video Source 1430 is optionally configured to provide a separate video stream for each player based on their point of view. Further, Video Source 1430 may be configured to provide a different frame size, frame data size, and/or encoding to each of Client 1410. Video Source 1430 is optionally configured to provide 3-D video.

I/O Device 1445 is configured for Video Server System 1420 to send and/or receive information such as video, commands, requests for information, a game state, gaze information, device motion, device location, user motion, client identities, player identities, game commands, security information, audio, and/or the like. I/O Device 1445 typically includes communication hardware such as a network card or modem. I/O Device 1445 is configured to communicate with Game Server 1425, Network 1415, and/or Clients 1410.

Processor 1450 is configured to execute logic, e.g. software, included within the various components of Video Server System 1420 discussed herein. For example, Processor 1450 may be programmed with software instructions in order to perform the functions of Video Source 1430, Game Server 1425, and/or a Client Qualifier 1460. Video Server System 1420 optionally includes more than one instance of Processor 1450. Processor 1450 may also be programmed with software instructions in order to execute commands received by Video Server System 1420, or to coordinate the operation of the various elements of Game System 1400 discussed herein. Processor 1450 may include one or more hardware device. Processor 1450 is an electronic processor.

Storage 1455 includes non-transitory analog and/or digital storage devices. For example, Storage 1455 may include an analog storage device configured to store video frames. Storage 1455 may include a computer readable digital storage, e.g. a hard drive, an optical drive, or solid state storage. Storage 1415 is configured (e.g. by way of an appropriate data structure or file system) to store video frames, artificial frames, a video stream including both video frames and artificial frames, audio frame, an audio stream, and/or the like. Storage 1455 is optionally distributed among a plurality of devices. In some embodiments, Storage 1455 is configured to store the software components of Video Source 1430 discussed elsewhere herein. These components may be stored in a format ready to be provisioned when needed.

Video Server System 1420 optionally further comprises Client Qualifier 1460. Client Qualifier 1460 is configured for remotely determining the capabilities of a client, such as Clients 1410A or 1410B. These capabilities can include both the capabilities of Client 1410A itself as well as the capabilities of one or more communication channels between Client 1410A and Video Server System 1420. For example, Client Qualifier 1460 may be configured to test a communication channel through Network 1415.

Client Qualifier 1460 can determine (e.g., discover) the capabilities of Client 1410A manually or automatically. Manual determination includes communicating with a user of Client 1410A and asking the user to provide capabilities. For example, in some embodiments, Client Qualifier 1460 is configured to display images, text, and/or the like within a browser of Client 1410A. In one embodiment, Client 1410A is an HMD that includes a browser. In another embodiment, client 1410A is a game console having a browser, which may be displayed on the HMD. The displayed objects request that the user enter information such as operating system, processor, video decoder type, type of network connection, display resolution, etc. of Client 1410A. The information entered by the user is communicated back to Client Qualifier 1460.

Automatic determination may occur, for example, by execution of an agent on Client 1410A and/or by sending test video to Client 1410A. The agent may comprise computing instructions, such as java script, embedded in a web page or installed as an add-on. The agent is optionally provided by Client Qualifier 1460. In various embodiments, the agent can find out processing power of Client 1410A, decoding and display capabilities of Client 1410A, lag time reliability and bandwidth of communication channels between Client 1410A and Video Server System 1420, a display type of Client 1410A, firewalls present on Client 1410A, hardware of Client 1410A, software executing on Client 1410A, registry entries within Client 1410A, and/or the like.

Client Qualifier 1460 includes hardware, firmware, and/or software stored on a computer readable medium. Client Qualifier 1460 is optionally disposed on a computing device separate from one or more other elements of Video Server System 1420. For example, in some embodiments, Client Qualifier 1460 is configured to determine the characteristics of communication channels between Clients 1410 and more than one instance of Video Server System 1420. In these embodiments the information discovered by Client Qualifier can be used to determine which instance of Video Server System 1420 is best suited for delivery of streaming video to one of Clients 1410.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method, comprising:
   presenting gameplay of a video game through a head-mounted display, the head-mounted display being disposed in a local environment;
   detecting a person speaking in the local environment, wherein detecting the person speaking includes capturing audio from the local environment by the head-mounted display, and analyzing the captured audio to identify the person speaking in the local environment;
   responsive to detecting the person speaking in the local environment, presenting a notification through the head-mounted display, the notification providing an option to pause the gameplay of the video game;
   responsive to receiving a command indicating selection of the option, pausing the gameplay of the video game and presenting through the head-mounted display a view provided through an externally facing camera of the head-mounted display that enables viewing of the person speaking in the local environment.

2. The method of claim 1, wherein detecting the person speaking in the local environment includes applying voice recognition to the captured audio to determine an identity of the person speaking in the local environment.

3. The method of claim 1, wherein detecting the person speaking in the local environment includes applying sound localization to the captured audio to determine a location of the person speaking in the local environment.

4. The method of claim 3, wherein presenting the view through the externally facing camera of the head-mounted display is defined to open from a direction that is towards the location of the person speaking in the local environment.

5. The method of claim 1, wherein detecting the person speaking in the local environment includes capturing images by the externally facing camera of the head-mounted display and analyzing the captured images to identify the person speaking in the local environment.

6. The method of claim 5, wherein detecting the person speaking in the local environment includes applying image recognition to the captured images to determine an identity of the person speaking in the local environment.

7. The method of claim 5, wherein detecting the person speaking in the local environment includes analyzing the captured images to determine a location of the person speaking in the local environment.

8. The method of claim 7, wherein presenting the view through the externally facing camera of the head-mounted display is defined to open from a direction that is towards the location of the person speaking in the local environment.

9. The method of claim 1, wherein pausing the gameplay of the video game includes identifying an intensity of a gameplay aspect, and progressively reducing the intensity of the gameplay aspect before entering a paused state.

10. The method of claim 9,
wherein the intensity of the gameplay aspect is defined by a velocity of a virtual element; and
wherein progressively reducing the intensity of the gameplay aspect includes progressively reducing the velocity of the virtual element.

11. The method of claim 10, wherein a location of the virtual element in a virtual space defines a view of the virtual space presented on the head-mounted display, the view of the virtual space changing in accordance with the velocity of the virtual element.

12. The method of claim 9,
wherein the intensity of the gameplay aspect is defined by a density of virtual elements presented on the head-mounted display; and
wherein progressively reducing the intensity of the gameplay aspect includes progressively reducing the density of virtual elements presented on the head-mounted display.

13. The method of claim 9, wherein the intensity of the gameplay aspect is defined by a complexity of graphics presented on the head-mounted display; and
wherein progressively reducing the intensity of the gameplay aspect includes progressively simplifying the graphics presented on the head-mounted display, wherein simplifying the graphics includes removing one or more visual elements from a scene.

14. The method of claim 9, further comprising,
receiving a signal to resume gameplay of the video game;
in response to receiving the signal to resume gameplay, transitioning the gameplay from the paused state to an active state;
wherein transitioning the gameplay from the paused state to the active state includes progressively increasing the intensity of the gameplay aspect.

15. The method of claim 14, wherein transitioning the gameplay from the paused state to the active state includes identifying a first gameplay timepoint earlier than a second gameplay timepoint at which the gameplay was paused, and initiating the transitioning from the paused state to the active state from the first gameplay timepoint.

16. A method, comprising:
presenting gameplay of a video game through a head-mounted display, the head-mounted display being disposed in a local environment;
detecting a person speaking in the local environment, wherein detecting the person speaking includes capturing audio from the local environment by the head-mounted display, capturing images by an externally facing camera of the head-mounted display, and analyzing the captured audio and the captured images to identify the person speaking in the local environment;
responsive to detecting the person speaking in the local environment, presenting a notification through the head-mounted display, the notification providing an option to pause the gameplay of the video game;
responsive to receiving a command indicating selection of the option, pausing the gameplay of the video game and presenting through the head-mounted display a view provided through the externally facing camera of the head-mounted display that enables viewing of the person speaking in the local environment.

17. The method of claim 16, wherein detecting the person speaking in the local environment includes applying voice recognition to the captured audio and/or applying image recognition to the captured images to determine an identity of the person speaking in the local environment.

18. The method of claim 16, wherein detecting the person speaking in the local environment includes applying sound localization to the captured audio and/or analyzing the captured images to determine a location of the person speaking in the local environment.

19. The method of claim 18, wherein presenting the view through the externally facing camera of the head-mounted display is defined to open from a direction that is towards the location of the person speaking in the local environment.

20. The method of claim 16, wherein pausing the gameplay of the video game includes identifying an intensity of a gameplay aspect, and progressively reducing the intensity of the gameplay aspect before entering a paused state.

* * * * *